March 29, 1927.
H. C. GIBSON
1,622,867
RESILIENT ROAD WHEEL
Filed March 24, 1926
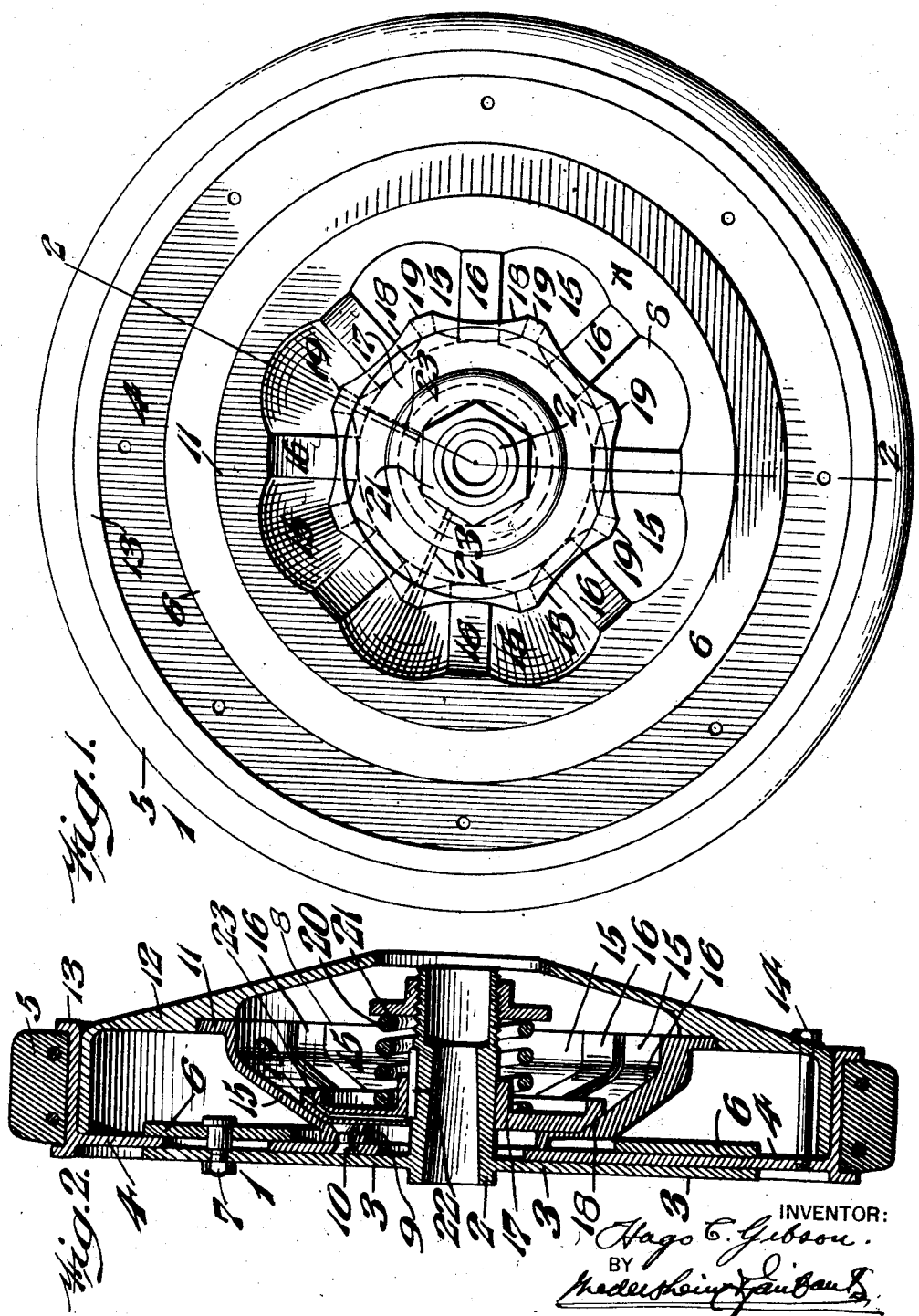
INVENTOR:
Hugo C. Gibson.
BY
ATTORNEYS.

Patented Mar. 29, 1927.

1,622,867

UNITED STATES PATENT OFFICE.

HUGO C. GIBSON, OF PHILADELPHIA, PENNSYLVANIA.

RESILIENT ROAD WHEEL.

Application filed March 24, 1926. Serial No. 96,939.

This invention is a new and useful resilient road wheel whose working elements consist of a hub mounted on the vehicle axle; a wheel structure with its tire having a plane surface coacting slidably with the face of the hub flange and having teeth or wedges projecting from the plane of said wheel structure; a disc coaxial with the hub and slidable upon the cylindrical portion thereof having fluted edges adapted to coact with the teeth or wedges of the wheel structure; a spring seated upon an attachment to the hub at one of its ends so that its other end presses upon the disc for the purpose of causing the flutes of the disc to coact with the inclined surfaces of the wheel structure, so that the resultant coacting pressure upon said wedge teeth will cause the wheel structure to tend to maintain a coaxial or concentric relation to the hub.

Heretofore the general type of wheel described has been provided with wedges projecting from and related to the plane of the wheel structure proper, which are formed in the shape of narrow or thin teeth. The sudden engagement of the fluted portions of the disc with these projecting teeth causes the breakage of these teeth because of their weak and unsupported structure. A great expense and difficulty is found in satisfactorily attaching the teeth to the wheel. Such teeth are necessarily set on radial lines and such parts of the teeth as occur at the greater radial distance from the center of the wheel are necessarily set further apart from one another than the portions which occur at a less radial distance.

Since the fluting of the disc gives a fixed dimension from the center of one flute to another and there being the same number of flutes in the disc as there are wedges in the wheel, it is clear that all the flutes of the disc can only coincide with all the wedges when the wheel is in concentric relation to the hub. At any other position, it frequently occurs that there is only one flute in contact with one wedge at a given time. Thus, in the rotation of the wheel it becomes necessary for the disc flutes to step over from one projecting wedge to the next projecting wedge, thereby closing the space between the next flute and wedge and causing a noise of contact and considerable wear in consequence of the resultant hammer blow of contact.

Another disadvantage of the existing individual tooth device is that the lubricant material with which the working parts of the wheel are packed can distribute itself into the large spaces existing between the projecting wedge teeth, remaining in that position and serving no lubrication purpose.

This invention has for its object the elimination of the above mentioned faults by eliminating individual wedge teeth and substituting a bowl-shaped device having its inner surface so formed as to provide inclined surfaces at the position where the wedge teeth would otherwise occur and having the spaces between the teeth filled in so that the disc in its movement in relation to the bowl will sweep all of the interior surfaces of the bowl at some time during the gyrations therein, thus forcing the lubricant to change its location within the bowl continuously and by so changing its location to force that lubricant to contact with the surface of the hub upon which the disc slides.

An additional provision for this purpose is to provide holes through the substance of the disc or elsewhere whereby the lubricant under pressure as described may pass through the hole to the surface of the hub for the same purpose.

The portions of the outer edge of the disc which occur between the flutes heretofore have projected somewhat into the spaces between the wedges and in this new arrangement the surface of the bowl between the wedges is so shaped that at any position of the disc in relation to the bowl these projecting portions of the disc will actually contact with the interior surface of the bowl between the wedges, thus gaining surface of wearing contact between the disc and the bowl which would otherwise be confined to the contact between the flute and the surface of the wedge and avoiding the noise of impact.

Further, the self supporting character of the bowl permits its attachment to the sliding wheel structure at its smaller diameter thus permitting the use of devices for securing the sliding wheel structure against lateral movement at positions much nearer the axis of the hub than was formerly possible with the result that wheels of much less overall diameter can now be constructed than was formerly possible.

The attachment of the bowl at its larger diameter to the outer wheel housing provides an added strength to the whole structure hitherto unobtainable.

The bowl forms a container for lubricant which prevents the escape of lubricant radially and it eliminates one packing joint formerly found necessary when wedge teeth are used.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Fig. 1, represents a side elevation of a novel resilient road wheel embodying my invention.

Fig. 2, represents a section on line 2—2 of Fig. 1.

Similar numerals of reference indicate corresponding parts.

1 designates my novel construction of road wheel, the same comprising the hub 2, which is entirely of the conventional construction and adapted to fit upon the axle of an automobile or other vehicle. 3 designates an extended flange which may be integral with or secured to said hub, and is of sufficient diameter to overlap the holes in the wheel plate 4 which carries the tire 5. The wheel plate 4 is slidable between the flange 3 and the inner ring 6, which latter is held in fixed relation to said flange 3 by the shouldered bolts 7. 8 designates a hollow truncated cone or bowl having its smaller end 9 fastened to the wheel plate 4, at the points 10, preferably by a plurality of rivets. 11 designates a flange at the larger end of the cone 8 which is recessed into the wheel cover 12 which serves as a support for the rim extension 13 of the wheel plate 4 and is bolted to the wheel plate 4 by a plurality of bolts, or cap screws 14—whereby a very rigid wheel structure is produced, since the inherently rigid hollow truncated cone of bowl 8 obviously stiffens and reinforces every portion of the wheel structure in relation to every other portion thereof.

The interior surface of the bowl 8 is formed into a series of flutes 15, merging into the flat surfaces 16. 17 designates a star shaped disc having the outer flutes 18 which merge into the noses 19, said flutes 18 being adapted to ride over the flats 16, when the wheel structure 4 and its adjuncts are forced out of concentric relation to the hub by road shock or torque effort. During this operation the star disc 17 slides along the outer cylindrical portion of the hub 2 against the pressure of the spring 20, which is seated upon the face of the nut 21, which is secured upon the outer portion of the hub 2. The star disc 17 is prevented from rotation on the hub 2 by the keys or splines 22.

The operation is as follows:

The parts, when the wheel is not under load, appear substantially as seen in Figures 1 and 2. When the load is applied to the axle and thereby to the hub 2 and its flange 3 the disc 17 may slide outwardly and along the surfaces of the flats 16, thus compressing the spring 20 which resists excess movement of said disc 17. This spring 20 also tends to return the disc 17 to its concentric or normal position. A similar action occurs in rotation when a protuberance in the road is encountered, said protuberance having the effect of rotating the wheel plate 4 and its rigidly connected parts which operate as a unit in relation to the disc 17, said disc being slidably mounted upon the hub 2 and provided with keys or splines 22.

It is clear that this rotational movement can only be accomplished through the fluted portions 18 of the star disc 17 mounting the flats 16 by a mutual sliding action, thus causing the disc 17 to move outwardly upon the hub 2, thereby compressing the spring 20 said spring always tending to return the disc 17 to its normal position.

When the power of the engine is transmitted to the hub 2 for the purpose of rotating the wheel and so propelling the vehicle, or in the case of the application of a brake for the purpose of retarding the vehicle, the operation of the disc is similar to that described as occurring when the wheel meets a protuberance in the road; and it is clear that all of these causes for disturbing the normal relationship of the wheel plate 4 and its related parts to the hub, may occur separately or coincidently, and in the case of extreme shock, the spring 20 may be compressed to nearly its maximum at the period when the star disc 17 has moved to its extreme outer position when its flutes approach the cylindrical portion of the flats 16.

It will be understood from the foregoing that the bowl 8 taken in conjunction with the cover plate 12 and the hub flange 3 forms a closed receptacle for the lubricant, so that there is no waste thereof and because the star disc 17 in its gyrations within the bowl 8 thoroughly sweeps the surface of said bowl, it causes the mass of lubricant to move from one position to another continuously thus utilizing the same to a maximum extent.

If desired I may employ the lubricant passage 23, whereby the lubricant is conveyed therethrough to the hub 2.

The cost of manufacture of the bowl 8 is very much less than that of the built up structure of the prior art having individual wedge teeth.

The shape of the bowl 8 particularly in reference to its attachment to the wheel plate 4 permits the use of this device in a smaller diameter of road wheel than is otherwise possible, thus extending the possibility of use of this type of wheel for road vehicles.

It will now be apparent that I have devised a novel and useful resilient road wheel which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention what I claim as new and desire to secure by Letters Patent is:—

1. In a device of the character stated, a road wheel provided with a hub, a hub flange therefor, a wheel plate slidable on said hub flange, a bowl with a fluted surface secured thereto, and a spring pressed fluted disc contained within said bowl and coacting therewith.

2. In a device of the character stated, a road wheel provided with a hub, a hub flange therefor, a wheel plate, a bowl secured thereto, and a spring pressed disc contained within said bowl and coacting therewith, said bowl having on its inner surface alterating flats and flutes, and said disc having on its juxtaposed surface coacting noses and flutes.

3. In a device of the character stated, a road wheel comprising a hub, a hub flange connected thereto, a wheel plate slidable on said hub flange, an inner ring secured to said hub flange, a bowl shaped structure with a corrugated surface secured to said wheel plate, a star shaped disc having a coacting corrugated surface mounted on said hub so as to rotate in unison therewith but adapted to slide longitudinally thereon, an abutment on the outer portion of said hub, and a spring interposed between said abutment and said star shaped disc.

4. In a device of the character stated, a road wheel comprising a hub, a hub flange connected thereto, a wheel plate, an inner ring secured to said hub flange, a bowl shaped structure secured to said wheel plate, a star shaped disc mounted on said hub so as to rotate in unison therewith but adapted to slide longitudinally thereon, an abutment on the outer portion of said hub, and a spring interposed between said abutment and said star shaped disc, said inner surface of said bowl being provided with alternating flats and flutes, and the juxtaposed surface of said disc being provided with alternating noses and flutes.

5. In a device of the character stated, a road wheel provided with a hub, a hub flange therefor, a wheel plate slidable on said hub flange, a bowl secured thereto, a spring pressed disc contained within said bowl and coacting therewith, said bowl and disc having contiguous coacting radial corrugations and a cover plate for inclosing said bowl and disc.

6. In a device of the character stated, a road wheel provided with a rim and a hub, a hub flange for the latter, a wheel plate, a bowl secured thereto, a spring pressed disc contained within said bowl and coacting therewith, and a plate coacting with said bowl, the latter having an outer flange seated in said plate and the exterior of said plate forming a support for said wheel rim.

7. In a device of the character stated, a road wheel provided with a rim and a hub, a hub flange for the latter, a wheel plate, a bowl secured thereto and provided with alternating flats and flutes, a spring pressed disc contained within said bowl and having coacting flutes and noses, and a cover plate coacting with said bowl, the latter having an outer flange seated in said plate, and the exterior of said cover plate forming a support for said wheel rim.

8. In a device of the character stated, a road wheel provided with a hub, a hub flange therefor, a wheel plate slidable on said hub flange, a bowl secured thereto, and a spring pressed disc contained within said bowl and coacting therewith, said bowl having on its inner surface radial corrugations, and said disc having on its juxtaposed contiguous surface coacting radial corrugations.

HUGO C. GIBSON.